United States Patent
Illy

[11] 3,991,043
[45] Nov. 9, 1976

[54] QUATERNIZATION OF BENZTHIAZOLE-AZO COMPOUNDS

[75] Inventor: Hugo Illy, Toms River, N.J.

[73] Assignee: Toms River Chemical Corporation, Toms River, N.J.

[22] Filed: Nov. 27, 1974

[21] Appl. No.: 527,915

Related U.S. Application Data

[63] Continuation of Ser. No. 326,716, Jan. 23, 1973, abandoned, which is a continuation of Ser. No. 129,632, March 30, 1971, abandoned, which is a continuation-in-part of Ser. No. 760,681, Sept. 18, 1968, abandoned.

[52] U.S. Cl. .............................................. 260/158
[51] Int. Cl.² ........................................ C09B 43/00
[58] Field of Search ................. 260/146 R, 158, 208

[56] References Cited
UNITED STATES PATENTS

| | | |
|---|---|---|
| 2,864,812 | 12/1958 | Bossard et al. ................. 260/146 R |
| 2,883,373 | 4/1959 | Bossard et al. ................. 260/146 R |
| 3,102,879 | 9/1963 | Baumann et al. .................... 260/157 |
| 3,133,052 | 5/1964 | Merian et al. ...................... 260/158 |
| 3,216,995 | 11/1965 | Baumann et al. .................... 260/157 |
| 3,314,934 | 4/1967 | Leuchs .............................. 260/158 |

*Primary Examiner*—Charles F. Warren
*Attorney, Agent, or Firm*—Joseph G. Kolodny; Edward McC. Roberts; Prabodh I. Almaula

[57] ABSTRACT

A process for the manufacture of water soluble dyestuffs of the formula

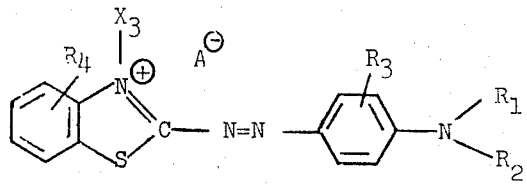

wherein
$R_1$ and $R_2$ are independently selected from the group consisting of lower alkyl, hydroxy lower alkyl, cyano lower alkyl and phthalimide lower alkyl or $R_1$ and $R_2$ taken together with the attached nitrogen are morpholino;
$R_3$ and $R_4$ are independently selected from the group consisting of hydrogen, halogen, lower alkyl and lower alkoxy;
$X_3$ is lower alkyl; and
$A^-$ is an anion including the step of treating the corresponding non-quaternized benzthiazole-azo compound with a di-lower alkyl sulfate in an alkaline aqueous medium, including the improvement of using a large excess of the di-lower alkyl sulfate. The dyestuffs are obtained in good yield by the inventive process and are valuable blue dyestuffs, particularly useful for coloring acrylic fibers.

7 Claims, No Drawings

QUATERNIZATION OF BENZTHIAZOLE-AZO COMPOUNDS

This is a continuation of Application Ser. No. 326,716, filed Jan. 23, 1973, now abandoned, which was a continuation of Application Ser. No. 129,632, filed Mar. 30, 1971, now abandoned, which was a continuation-in-part of Application Ser. No. 760,681, filed Sept. 18, 1968, now abandoned.

BACKGROUND OF THE INVENTION

Water soluble quaternary cationic dyes of the formula (II)

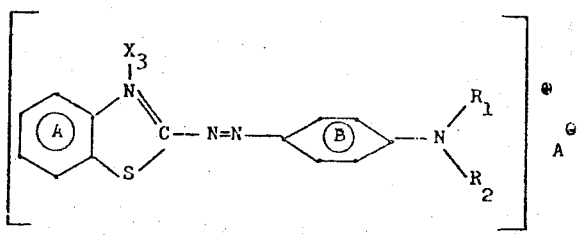

wherein $R_1$ and $R_2$ have the meaning assigned above, $X_3$ is alkyl and A is an anion, are known.

These dyes have heretofore been prepared by the quaternization of a compound of the formula (I) with an excess of a dialkyl sulfate in an inert organic solvent such as chlorobenzene, chloroform, benzene, xylene, acetonitrile or the like. This procedure, however, has disadvantages in commercial practice since the use of a solvent presents an undesirable hazard and since an additional step of solvent recovery must be carried out in order to make the procedure economically practical. Further, in order to bring the reaction to completion, it is necessary that the reaction be carried out at elevated temperatures, particularly at or near the boiling point of the solvent.

The use of such high temperatures results in the formation of tarry and oily impurities, thus making it necessary to clarify the solvent-free cake by dissolving it in water and treating the solution formed with a filter aid such as charcoal before isolation of the cationic dye.

A further disadvantage of the use of organic solvent in the quaternization of compounds of formula (I), is that even when the reaction is carried out at the boiling point of the solvent unreacted material remains which is difficult to separate from the product and accordingly the dyestuffs obtained give a reddish staining on wool and cotton which is not in tone with the blue dyeing obtained on acrylic fiber. This is a definite disadvantage in the dyeing of fiber blends. Dyestuffs prepared by the process of the present invention either do not stain on wool or cotton or give slight stains which are in tone with the blue coloring on acrylic fibers.

It is desirable to provide an economical, commercially practicable process for the preparation of quaternized benzthiazole-azo dyestuffs.

SUMMARY OF THE INVENTION

The present invention relates to and has for its objects the provision of a novel process for the quaternization of benzthiazole-azo dyes of formula (I) by reacting the dye with a dialkylsulfoester in aqueous medium in the presence of a basic substance, such as the oxides, carbonates, bicarbonates or acetates of the alkali or alkaline earth metals, at temperatures of from 10° to 90° C.

It has been surprisingly found that the quaternization reaction of Compound I above, takes place substantially on the benzthiazole nitrogen in contrast to the amino nitrogen of the phenyl moiety when the reaction is carried out in an aqueous medium in the presence of an excess of dialkylsulfate. One would not expect such a selective reaction to occur in view of the prior art as represented by Chemische Berichte Vol. 85, No. 11 (1952) pg. 1056, which clearly demonstrates that aniline type compounds are readily quaternized in the presence of water with an excess of dialkylsulfate. It has also been surprisingly found that the quaternization reaction at temperatures of from 10°–90° C, and especially 10°–35° C, result in yields that are higher than those obtained from the reaction carried out in organic solvents at such temperatures in addition to leading to products which are more easily isolated and purified. Accordingly there are two surprising aspects of this invention. On the one hand, it has been found that Compound I above can be readily quaternated in the presence of water and thereby eliminate the disadvantages occasioned when the same reaction is carried out in the presence of an organic solvent and further that this reaction can be carried out in the presence of water with the resultant quaternization of substantially only the nitrogen of the benzthiazole moiety.

DESCRIPTION OF THE PREFERRED EMBODIMENT

In the process of the present invention a benzthiazole-azo compound of the formula

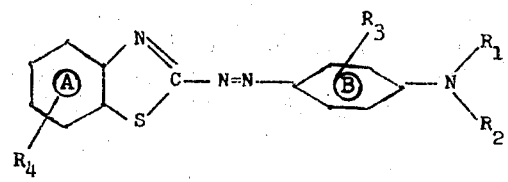

wherein $R_3$ and $R_4$ are each hydrogen, halogen (i.e. chloro or bromo lower alkyl such as methyl, ethyl, propyl or butyl, lower alkoxy such as methoxy, ethoxy, propoxy, or butoxy, and $R_1$ and $R_2$ individually represent lower alkyl, such as methyl, ethyl, propyl or butyl, substituted alkyl, such as cyanoloweralkyl containing from 2 to 6 carbon atoms, such as β-cyanoethyl or β-cyanopropyl, hydroxyloweralkyl containing from 1 to 6 carbon atoms, chloroloweralkyl of from 1 to 6 carbon atoms, such as β-chloromethyl or β-chloropropyl, loweralkanoyloxyloweralkyl of up to 6 carbon atoms such as β-acetoxyethyl, β-propionyloxyethyl or β-acetoxypropyl, lower alkoxy such as methoxy, ethoxy, propoxy or butoxy, aryl such as benzyl, phenyl or naphthyl, dicarboximidoloweralkyl (as shown in U.S. Pat. No. 3,383,380) or, together, $R_1$ and $R_2$ can form with the nitrogen a heterocyclic group such as morpholino; is reacted with a dialkylsulfate (dimethyl-, diethyl- or dipropylsulfate) in aqueous medium in the presence of a basic substance at temperatures of 10°–90° C, preferably 15°–45° C, and especially 20°–35°. Although the reaction time is not critical, the time of reaction, as is well known in the field of chemistry, will depend upon the temperature of reaction and accordingly optimum results are obtained by carrying out the reaction at from about 0.5 hours to about 3.0 hours depending upon the temperature of reaction and preferably about 1 hour to about 2 hours. Although the reaction may be carried out in an aqueous medium containing a minor amount of polar organic solvent (substantially aqueous), the preferred aspect of the invention involves the use of an aqueous medium.

The benzthiazole-azo compounds of the above formula are known compounds. Thus, there can be employed according to the present invention the azo dyestuffs treated in accordance with the disclosures in U.S. Pat. Nos. 2,889,315; 3,132,133; 3,280,100; and 3,383,380.

The basic materials employed according to the present invention are any of the alkali metal or alkaline earth metal oxides, carbonates, bicarbonates or acetates. In particular, there can be employed sodium bicarbonate, magnesium oxide, magnesium carbonate, calcium carbonate, sodium acetate, potassium acetate or mixtures thereof.

For the achievement of optimum results, it has been found that the reaction should be carried out at a pH range of from pH 4 to pH 8. The amount of basic material employed is therefore dependent upon the pH desired.

The concentration of dyestuff to water can vary over a wide range of from about 1:1 to 1:5 with a concentration of about 1:2 to 1:3 representing the preferred concentration.

While the range of concentrations set forth above in general include those limits which have been found to be operative, it is to be understood that the lower limit of concentration of dyestuff to water is governed only by the viscous nature of the solution obtained and the practical difficulties of stirring the solution.

The reactants are employed in a molar proportion of from about 1:1 to about 10:1 moles of dialkylsulfate per mole of benzthiazole-azo compounds. Preferably, the reactants are employed in a ratio of about 3:1 to about 5:1 and is especially about 4:1.

If after completion of the reaction it is not possible to immediately isolate the dyestuff, the pH should be adjusted below 5.5 in order to prevent splitting of the disubstituted nitrogen in para position to the azo group. After adjustment of the pH solution of the dyestuff can, if desired, be effected by heating.

In general, the process is carried out by charging the wet cake of the benzthiazole-azo dye to water. The basic substance is then added, followed by the drop-wise addition of the dialkylsulfate, (although if desired the dialkylsulfate may be dissolved in an organic solvent), preferably at a temperature of 20°–35° C. Upon completion of the reaction, the quaternized cationic dye is isolated by salting out and filtration.

It is, of course, possible to vary the sequence of addition and, illustratively, the water and dialkyl sulfoester can be charged first.

It is an advantage of the present process that the necessity for the use of solvents and of all operations required thereby is avoided. The present process provides an efficient, economically advantageous process for the preparation of the desired dyestuff in good yield.

In the preferred aspect of this invention the reaction is carried out by the drop-wise addition of a dialkylsulfate to a reaction mixture comprising the benzthiazole compound in an aqueous medium containing a suitable base, at a reaction temperature of from about 15° to about 45° C, at a dye to water ratio of about 1:2 to about 1:3 and a dialkylsulfate to dye molar ratio of from about 3:1 to about 5-1.

The invention is illustrated but not limited by the following examples.

EXAMPLE 1

79 grams of the wet cake of the dye obtained by coupling diazotized 2-amino-6-methoxybenzthiazole to N-ethyl-N-phenylaminoethanol (equivalent to 35.6 grams 100% dye) is charged to 30 grams of water. The reaction mixture is stirred for 2 hours and 38 grams of sodium bicarbonate are then added. 54 grams of dimethylsulfate are dropped in over a ¼ hour period at 25°–30° C. The reaction mixture is maintained at 30° C for 1 hour.

The reaction mixture is then diluted with water to 800 grams and the pH is adjusted to 4.5 with dilute sulfuric acid. To the diluted reaction mixture there is added a solution containing 50.4 grams of zinc chloride and 7 grams of common salt resulting in the precipitation of the dyestuff which is then filtered and dried in vacuum at 70° C. 49 grams of product are obtained, having the formula

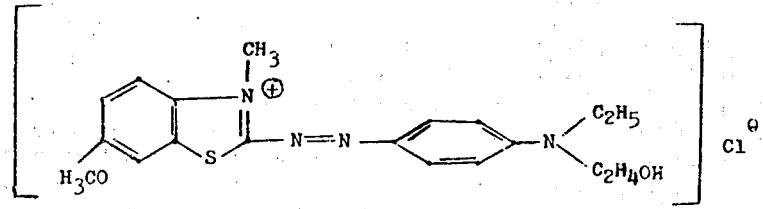

The above procedure is repeated employing the equivalent of 40 grams of the dye obtained by coupling 2-amino-5-acetylamino benzothiazole to N-phenylmorpholine.

50 grams of cationic dye are obtained, having the formula

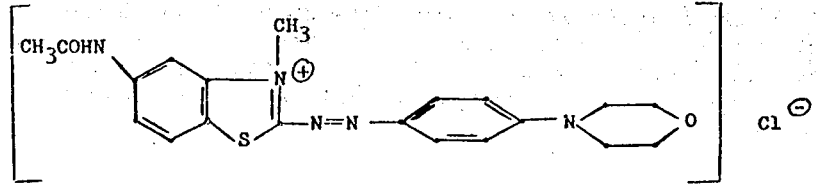

Similarly, when an equivalent amount of N-propyl-N-phenylaminopropane, N-ethoxy-N-phenylaminoethane, N,N-diphenylaminoethane, N-ethyl-N-phenyl-1-chloropropane or N-butyl-N-phenyl-1-propionic acid ethyl ester, is used in place of N-ethyl-N-phenyl aminoethanol in the above Example, the corresponding N-N-disubstituted dyestuff is obtained.

Similarly, when an equivalent amount of magnesium oxide, magnesium carbonate, calcium carbonate sodium acetate, potassium acetate, or a mixture of sodium acetate and potassium acetate is employed in place of sodium bicarbonate in the above Example, similar results are obtained.

Similarly, when an equivalent amount of diethylsulfate or dipropylsulfate is used in place of dimethylsulfate, similar results are obtained, (resulting in the ethyl or propyl quaternated dyestuff).

Similarly, when the reaction is carried out for 2½ hours at 15° C instead of 1¼ hours at 25°–30° C, similar results are obtained.

Similarly, when the reaction is carried out for 0.5 hours at 60°–65° C instead of 1¼ hours at 25°–30° C, similar results are obtained.

EXAMPLE 2

The procedure of Example 1 is repeated employing 49 grams of the dyestuff obtained by coupling the diazo component of Example 1 to N-β-phthalimidocthyl-N-ethyl-m-toluidine. 55 grams of a cationic dye are obtained, having the formula

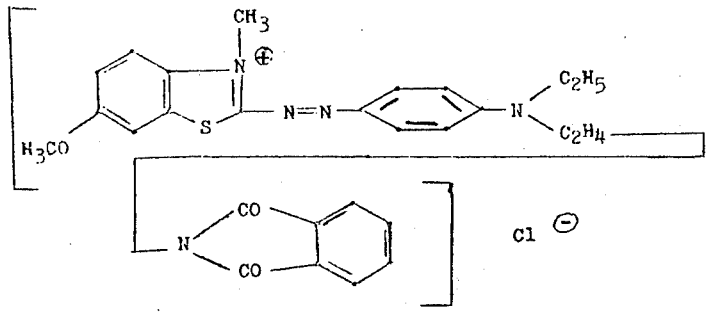

EXAMPLE 3

The procedure of Example 1 is repeated employing 32.2 grams of the dye obtained by coupling diazotized 2-aminobenzthiazole on N-cyanoethyl- ethyl-aniline. 40 grams of cationic dye are obtained, having the formula

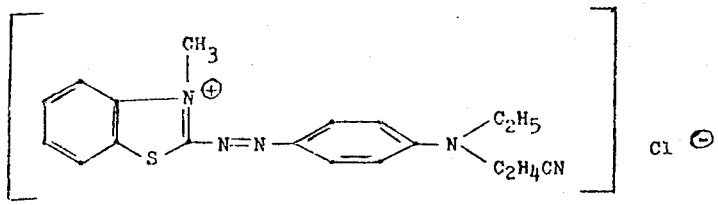 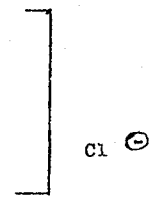

EXAMPLE 4

30 grams of water, 4.2 grams of magnesium oxide and 60 grams of dimethylsulfate are stirred with good agitation. 80 grams of wet cake of the dye of Example 1 are added at room temperature. The temperature is raised in the course of 1 hour to 75° C. The dyestuff is isolated by the salting out procedure of the second paragraph of Example 1. 47 grams of the quaternized dye of Example 1 are obtained.

I claim:
1. In the process of manufacturing a compound of the formula

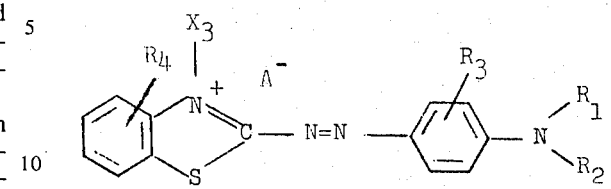

wherein
$R_1$ and $R_2$ are independently selected from the group consisting of lower alkyl, hydroxy lower alkyl, cyano lower alkyl and phthalimido lower alkyl or $R_1$ and $R_2$ taken together with the attached nitrogen are morpholino;

$R_3$ and $R_4$ are independently selected from the group consisting of hydrogen, halogen, lower alkyl, and lower alkoxy;

$X_3$ is lower alkyl; and $A^-$ is an anion, including the step of treating the corresponding non-quaternized benzthiazole-azo compound with a di-lower alkyl sulfate in the presence of water and base, the improvement which comprises using about 3.1 to about 5.1 mols of the di-lower alkyl sulfate per mol of the benzthiazole-azo compound.

2. The process of claim 1, wherein the base is a member selected from the group consisting of sodium bicarbonate, magnesium oxide, magnesium carbonate, calcium carbonate, sodium acetate, potassium acetate and mixtures thereof.

3. The process of claim 2, wherein the treatment is effected at a pH in the range of 4 to 8.

4. The process of claim 3, wherein the treatment is effected at a temperature in the range of 15° to 45° C.

5. The process of claim 4, wherein the ratio of benzthiazole-azo compound to water is about 1 to 2.

6. The process of claim 5, wherein the di-lower alkyl sulfate is dimethylsulfate.

7. The process of claim 6, wherein $R_1$ is ethyl, $R_2$ is hydroxy ethyl, $R_3$ is 6-methoxy, and $X_3$ is methyl.

* * * * *